US008640585B2

(12) United States Patent
Züst et al.

(10) Patent No.: US 8,640,585 B2
(45) Date of Patent: Feb. 4, 2014

(54) APPARATUS AND METHOD FOR PRODUCING MULTIPLE IMAGES OF A SPECIMEN

(75) Inventors: Reto Züst, Widnau (CH); Heinz Zimmermann, Balgach (CH)

(73) Assignee: Leica Microsystems CMS GmbH, Wetzlar (DE)

( * ) Notice: Subject to any disclaimer, the term of this patent is extended or adjusted under 35 U.S.C. 154(b) by 1496 days.

(21) Appl. No.: 11/469,976

(22) Filed: Sep. 5, 2006

(65) Prior Publication Data

US 2007/0053057 A1 Mar. 8, 2007

(30) Foreign Application Priority Data

Sep. 7, 2005 (DE) .......................... 10 2005 042 367

(51) Int. Cl.
*B26D 7/06* (2006.01)
(52) U.S. Cl.
USPC ........................................... 83/167; 83/915.5
(58) Field of Classification Search
USPC .......................... 83/167, 915.5, 365; 382/133
See application file for complete search history.

(56) References Cited

U.S. PATENT DOCUMENTS

| 3,103,844 | A | * | 9/1963 | Persson ............................. 83/167 |
| 3,377,898 | A | * | 4/1968 | Persson .............................. 83/78 |
| 3,727,506 | A | * | 4/1973 | Taylor et al. ............... 83/698.11 |
| 4,377,958 | A | | 3/1983 | Leighton |
| 4,484,503 | A | * | 11/1984 | Sitte et al. ........................ 83/717 |
| 4,505,175 | A | * | 3/1985 | Reichel ........................... 83/703 |
| 4,511,224 | A | * | 4/1985 | Sitte et al. ........................ 83/167 |
| 4,625,608 | A | * | 12/1986 | Behme et al. ................... 83/713 |
| 4,669,812 | A | * | 6/1987 | Hoebing ........................... 359/9 |
| 4,695,046 | A | * | 9/1987 | Berleth ........................ 269/210 |
| 4,932,044 | A | * | 6/1990 | Williams et al. ................ 377/10 |
| 4,960,330 | A | * | 10/1990 | Kerschmann ................... 356/36 |
| 5,048,300 | A | * | 9/1991 | Lihl ............................. 62/48.1 |
| 5,092,210 | A | * | 3/1992 | Dern .......................... 83/698.11 |
| 5,099,735 | A | * | 3/1992 | Kempe et al. .............. 83/699.61 |
| 5,226,335 | A | * | 7/1993 | Sitte et al. .......................... 83/74 |
| 5,301,671 | A | * | 4/1994 | Leighton et al. .............. 600/431 |
| 5,461,953 | A | * | 10/1995 | McCormick ...................... 83/36 |
| 5,761,977 | A | * | 6/1998 | Jakobi et al. ...................... 83/13 |
| 5,851,213 | A | * | 12/1998 | Berleth et al. ................ 606/167 |
| 5,974,811 | A | | 11/1999 | Heid et al. |
| 6,058,824 | A | * | 5/2000 | Neymeyr ................... 83/698.21 |
| 6,253,653 | B1 | * | 7/2001 | Walter et al. .................... 83/703 |
| 6,528,279 | B2 | | 3/2003 | Yokota et al. |
| 6,992,760 | B2 | * | 1/2006 | Mohun et al. ................. 356/317 |
| 7,372,985 | B2 | * | 5/2008 | So et al. ......................... 382/133 |
| 7,724,937 | B2 | * | 5/2010 | So et al. ......................... 382/133 |

(Continued)

FOREIGN PATENT DOCUMENTS

| DE | 3499872 | 12/1991 |
| DE | 102 42 275 | 4/2004 |
| JP | 2000-186987 | 4/2000 |

*Primary Examiner* — Sean Michalski
(74) *Attorney, Agent, or Firm* — Hodgson Russ LLP

(57) ABSTRACT

An apparatus for producing multiple images of a specimen, having a sliding microtome, is disclosed. The specimen is secured in a specimen holder, movably in a plane. A knife having a cutting edge is arranged above the specimen that is movable along a cutting direction. Provided on the side opposite the cutting edge of the knife is a microscope having a camera for acquiring a respective image of the just-produced cut surface of the specimen.

28 Claims, 4 Drawing Sheets

(56) References Cited

U.S. PATENT DOCUMENTS

| | | |
|---|---|---|
| 2004/0026630 A1 | 2/2004 | Mohun et al. |
| 2004/0035275 A1* | 2/2004 | Lihl et al. ............... 83/520 |
| 2005/0072285 A1* | 4/2005 | Lang et al. ............... 83/520 |
| 2005/0078471 A1* | 4/2005 | Lihl et al. ............... 362/92 |

* cited by examiner

APPARATUS AND METHOD FOR PRODUCING MULTIPLE IMAGES OF A SPECIMEN

CROSS REFERENCE TO RELATED APPLICATIONS

This application claims priority of the German patent application 10 2005 042 367.1 filed Sep. 7, 2005 which is incorporated by reference herein.

FIELD OF THE INVENTION

The invention relates to an apparatus for producing multiple images of a specimen. The invention relates in particular to an apparatus for producing three-dimensional images of a specimen having a sliding microtome that comprises a specimen holder which is movable in a plane and in which the specimen is clamped. Arranged above the plane is a knife holder holding a knife, the knife having a cutting edge for removing layers of the specimen in order thereby to produce a respective new cut surface. The knife having the cutting edge can be embodied in stationary or rotating fashion (e.g. as a milling cutter). The apparatus is further equipped with a microscope and a camera connected thereto, for acquiring an image of each just-produced cut surface of the specimen.

The invention further relates to a method for producing multiple images of a specimen. The invention relates in particular to a method for producing three-dimensional images of a specimen using a sliding microtome that comprises a specimen holder which is movable in a plane and in which the specimen is clamped. Provided above the plane is a knife holder in which is arranged a knife having a cutting edge.

BACKGROUND OF THE INVENTION

For diagnostic purposes, it is helpful if multiple images are acquired of a specimen or tissue sample that is to be investigated. For that purpose, images of the layers of a specimen are produced sequentially. These images can subsequently be assembled into a three-dimensional depiction of the entire specimen.

U.S. Patent Application US 2004/0026630 discloses, for this purpose, a method for imaging a histological specimen. Autofluorescence is excited in the specimen using light at a wavelength of 750 nm. Detection is accomplished with a CCD camera, an excitation filter having a wavelength of 510 nm being provided between the camera and the specimen. The weak autofluorescence signal is amplified by the camera by means of data manipulation. The autofluorescence is always acquired from the topmost surface of the specimen, a layer of the specimen being removed with a microtome, and an image then of that topmost layer being acquired. This is repeated several times, and the individual images are assembled into a three-dimensional image. A computer and a corresponding software program are provided for this purpose.

U.S. Pat. No. 4,960,330 discloses an apparatus for image acquisition. Here the specimen is embedded in a block and stained with fluorescing material. The block is secured in a holder, and thin sections are removed with a knife or the like. After each removal of a section, an image is acquired of the specimen surface that has thereby just been created. The images are acquired with a microscope or with a confocal microscope. The successive images are assembled by a computer into a three-dimensional image.

SUMMARY OF THE INVENTION

The object on which the present invention is based is that of creating an apparatus with which multiple images of a specimen can be produced in simple and reliable fashion.

A further object of the invention is to create a method with which multiple images of a specimen can be produced in simple and reliable fashion.

In accordance with the present invention, it is advantageous if the microscope is arranged on the side of the sliding microtome facing away from the cutting edge of the knife. The images of a specimen are produced by the fact that layers of a specimen are sequentially removed by the knife and an image is acquired, with the aid of the microscope, of each newly exposed surface of the specimen thereby just created. A linear motion of the specimen beneath the knife is produced with the sliding microtome. As a result of this motion, the topmost layer of the specimen is removed with the knife and the specimen travels, without reversing the motion direction, into an imaging position in which at least a portion of the specimen's surface is located in the object field of the microscope. The specimen then travels back into the starting position so that a further layer of the specimen can be removed. This occurs repeatedly in order thereby to obtain multiple images that can ultimately be assembled into a three-dimensional image of the specimen.

The knife holder is mounted on a knife holder support. The microscope is provided in a microscope holder above the plane in which the specimen holder travels. The knife holder support for the knife holder and the microscope holder for the microscope are displaceable, separately from one another or together, along a direction perpendicular to the plane in which the sample holder moves.

The knife holder is mounted on a knife holder support. The knife holder support is configured in such a way that the knife holder support also carries, in addition to the knife holder, the microscope holder with the microscope. The knife holder support, which carries the knife holder and the microscope, is displaceable along a direction perpendicular to the plane in which the specimen holder moves. The cutting edge of the knife is arranged in the knife holder in such a way that the cutting edge extends perpendicular to the motion direction and parallel to the plane in which the specimen holder is movable. After removal of a layer of the specimen, the cut section just produced travels into the object field of the microscope. The microscope itself is displaceable perpendicular to the motion direction of the specimen holder. Displacement of the microscope takes place along a guide. The microscope can be retained in lockable fashion with at least one clamping element.

Also provided is a control unit that controls the displacement of the knife holder support with regard to the thickness of the layer removed from the specimen, and controls the imaging, by the microscope, of the exposed surface just produced. Additionally provided is a computer that synchronizes the imaging procedure, controls the microscope, and performs image processing of the multiple images of the many just-produced cut surfaces of the specimen. The computer possesses a memory unit in which the successive images of the many just-produced cut surfaces of the specimen are stored for image processing.

An aspiration device that aspirates the removed layers of the specimen can also be provided in the region of the cutting edge. In addition to the aspiration device, a rotating brush can likewise be arranged in the region of the aspiration device so as thereby to loosen any layers that may be adhering to the cutting edge of the knife or to the specimen, so that they can be aspirated by the aspiration device. In a further embodiment of the invention, it is likewise possible for an aspiration device or a compressed-air device to be associated with the specimen in the region of the microscope.

It is particularly advantageous if the microscope is embodied as a stereomicroscope. A first advantage results when the evenness of the cut surface of the specimen is examined with the stereomicroscope, which allows unevenness to be detected three-dimensionally. Embodiment in the stereomicroscope of a third beam path serving for illumination, according to U.S. Pat. No. 6,563,113 B1, which document is hereby incorporated herein by reference, offers the particular advantage that no autofluorescence is produced in the observation beam paths and imaging is thus not impaired, since this arrangement offers an outstanding signal-to-noise ratio. Instead of a single camera, in the context of the stereomicroscope both observation beam paths can also be equipped with a camera; with each camera, a respective image of each cut surface can be acquired from a slightly different perspective, stored on the computer, and processed into stereo images. The effect of the differing perspective is that portions of the image that are not located in the focal plane, and thus not on the cut surface of the specimen, appear respectively at different positions in the two cameras' images of the same cut surface of the specimen. Such regions of the image can be eliminated by suitable evaluation and comparison of these two camera images, in order appreciably to improve the quality of the multiple images of the many just-produced cut surfaces of the sample, and the quality of the three-dimensional image. The two cameras can also be combined into one camera module in a shared housing, or integrated into the stereomicroscope. This ensures orientation with respect to one another.

In a method according to the present invention, the following steps are performed: firstly removal of a layer of the specimen is performed with the cutting edge of the knife. Preceding that, by motion of the knife holder support and thus also of the knife's cutting edge perpendicular to the plane in which the specimen holder travels, the cut thickness is adjusted and the specimen holder together with the specimen is moved along, proceeding from a starting position, beneath the knife. As a result, a respective new cut surface is produced. The specimen is moved beneath the microscope by means of the specimen holder that is movable in a plane, and the new cut surface is positioned in the object field of the microscope. Lastly, acquisition of an image of the new cut surface is accomplished with the camera. The knife holder is then raised and the specimen holder is moved into the starting position, so that a further cut surface can once again be produced. This method is performed until a sufficient number of images of different layers of the specimen have been collected in the computer, so that the computer can produce therefrom a three-dimensional depiction of the specimen.

BRIEF DESCRIPTION OF THE DRAWINGS

The subject matter of the invention is depicted schematically in the drawings and will be described below with reference to the Figures, in which.

DETAILED DESCRIPTION OF THE INVENTION

Figure 1:
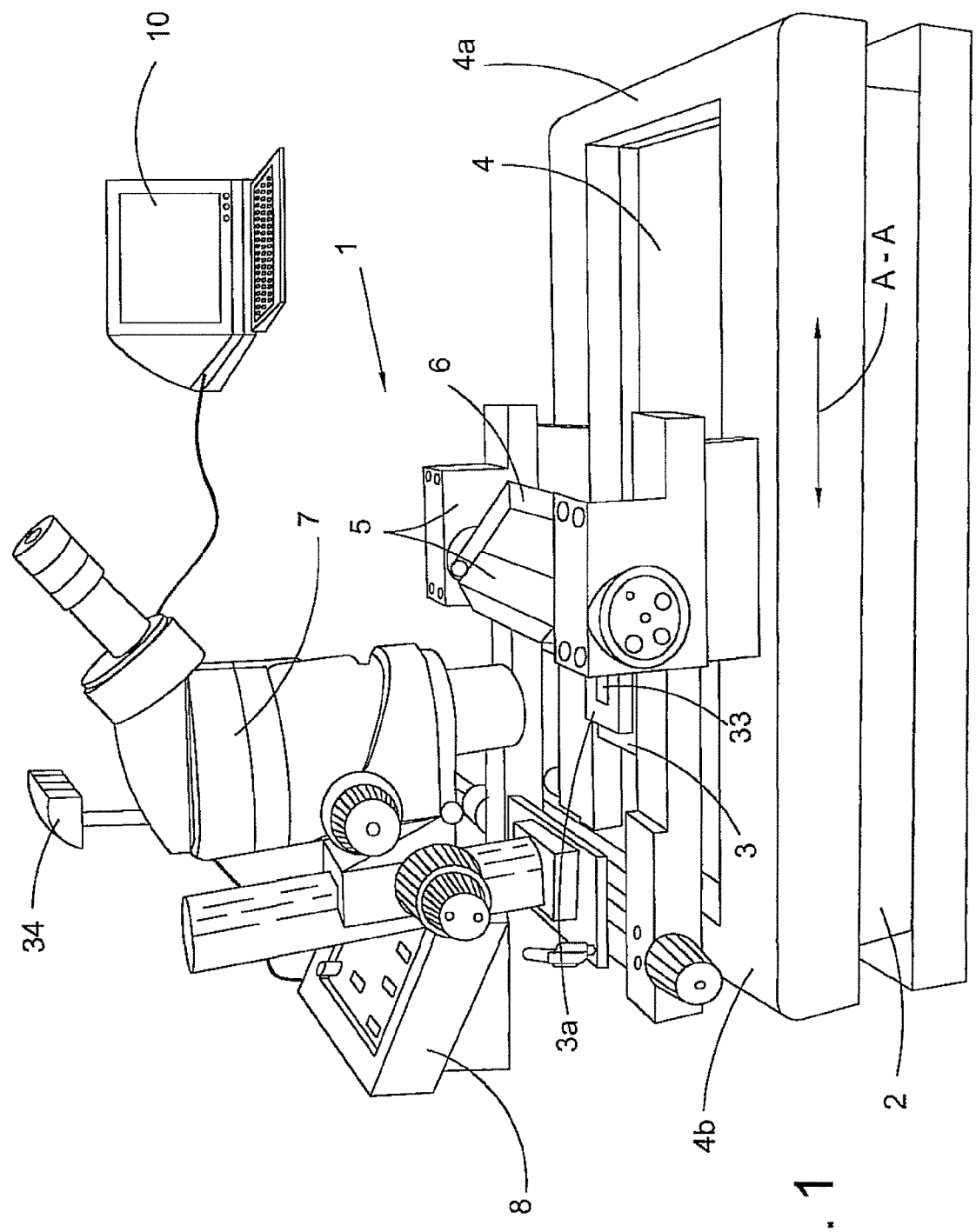
FIG. 1 is a perspective view of the apparatus for producing three-dimensional images of a specimen.

FIG. 1 is a perspective view of an apparatus 1 for producing multiple images of a specimen. Apparatus 1 is made up of a sliding microtome 2 that comprises a linearly movable specimen holder 3. The specimen holder 3 is arranged movably along the direction of double arrow A-A and in motion plane 4 of sliding microtome 2. A knife holder 5 is provided above motion plane 4 of sliding microtome 2. A knife 6, which can be adjusted appropriately onto specimen 3a that is to be cut, is arranged in knife holder 5. Sliding microtome 2 comprises a front end 4a into which specimen 3a with specimen holder 3 is moved into a starting position before a further layer of specimen 3a can be removed. Sliding microtome 2 similarly comprises a rear end 4b that is located behind knife holder 5. A microscope 7 is provided in the region of rear end 4b. In this embodiment, microscope 7 is embodied as a stereomicroscope. It is self-evident to anyone skilled in the art, however, that any type of microscope can be utilized in apparatus 1 according to the present invention. Sliding microtome 2 is further equipped with a control device 8 that serves to adjust the thickness of the layer to be removed, and to control and monitor further parameters of sliding microtome 2. Control unit 8 is furthermore connected to a computer 10 that ensures synchronization with sliding microtome 2 and also provides image processing of the images acquired by microscope 7.

Figure 2:
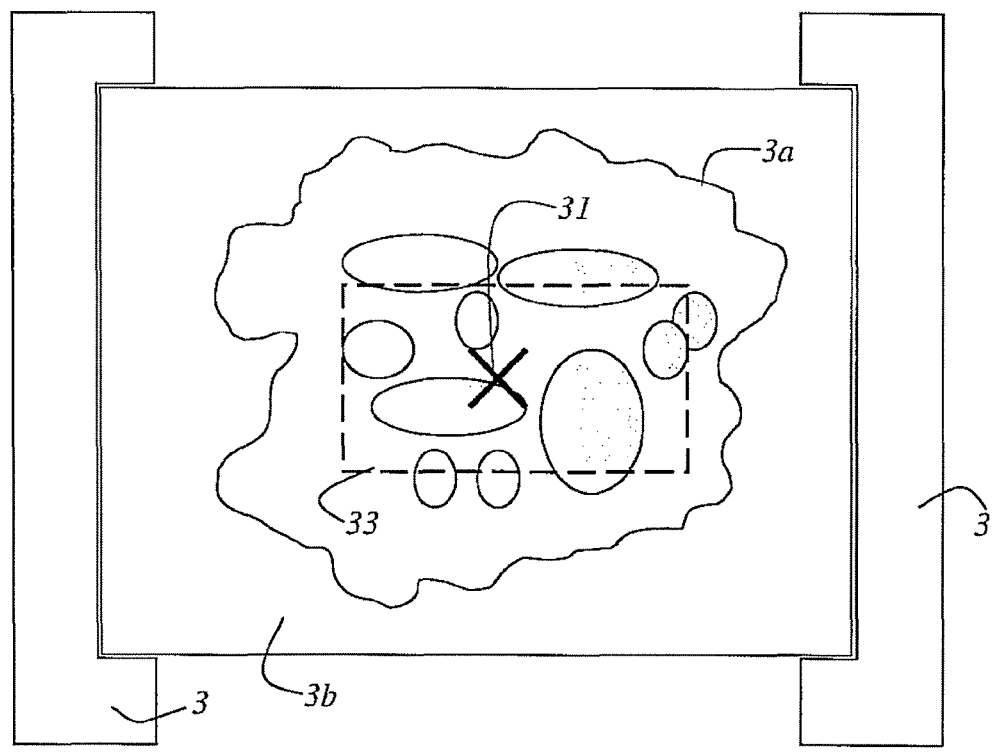
FIG. 2 is a plan view of the specimen holder, schematically depicting a cut surface produced on the specimen.

FIG. 2 is a plan view of specimen holder 3 with a schematic depiction of a cut surface of specimen 3a that has been produced. Specimen 3a is immobilized in an embedding material 3b. For imaging by microscope 7, sliding microtome 2 moves specimen holder 3 into optical axis 31 of microscope 7. The region of specimen 3a to be imaged with camera 34 is located in object field 33 of microscope 7. Each just-produced cut surface of specimen 3a is moved by sliding microtome 2, in interaction with the control unit, in such a way that the same region of specimen 3a is always brought into object field 33 of microscope 7.

Figure 3:
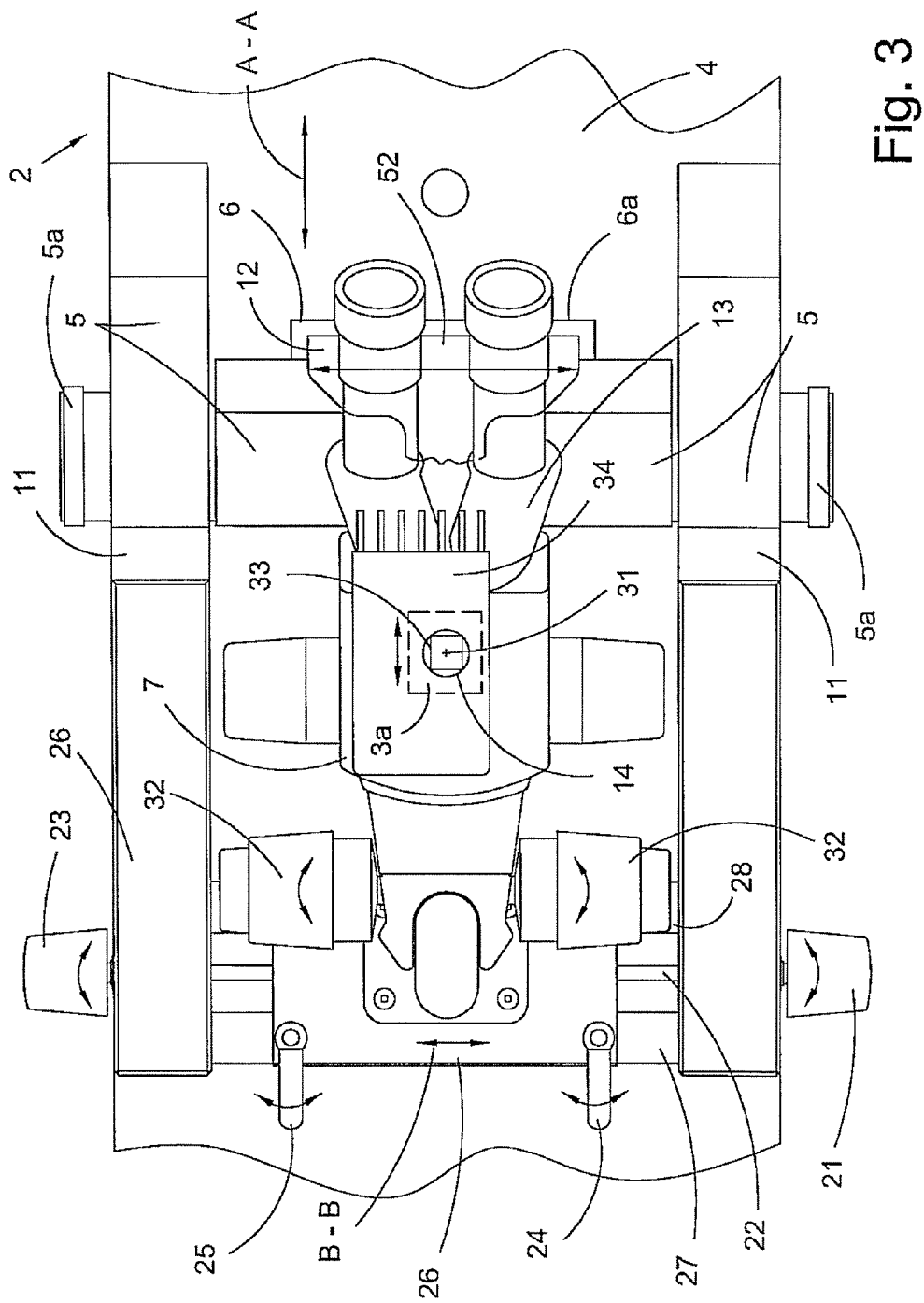
FIG. 3 is a plan view of a region of the apparatus showing the arrangement of the microscope and the knife.

FIG. 3 is a plan view of a portion of the apparatus, showing in particular the arrangement of microscope 7 and of knife holder 5. A knife 6 is secured in knife holder 5. Knife 6 comprises a cutting edge 6a with which the layers are successively removed from specimen 3a. Knife holder 5 is secured in a knife holder support 11 (see FIG. 4). Knife holder 5 possesses at least one adjusting element 5a with which the inclination of cutting edge 6a of knife 6 can be adjusted. In the embodiment depicted here, an aspiration device 12 is provided in the region of cutting edge 6a of knife 6. With aspiration device 12, it is possible to aspirate the sections that have been removed, so that contamination or soiling of sliding microtome 2 is avoided. Specimen holder 3, together with specimen 3a, is movable along double arrow A-A in motion plane 4 of sliding microtome 2. As a result of the motion of specimen holder 3 beneath knife 6, the topmost layer of the specimen is removed by means of cutting edge 6a. Specimen holder 3 then continues to travel, and arrives in photo position 14 of microscope 7. Because the focal plane of microscope 7 is arranged in the same plane as cutting edge 6a of knife 6, refocusing after removal of the section is not necessary. This is achieved by the fact that microscope 7 is constrainedly coupled, by way of a vertical displacement of the cutting knife or of the specimen, to the adjustment of the section thickness. After cutting, the cut surface of specimen 3a is always located in the same plane as cutting edge 6a. Microscope 7 is equipped with a binocular eyepiece 13 through which the user can visually observe, in object field 33 of microscope 7, the cut surface that has just been created.

In the embodiment depicted in FIG. 3, knife holder support 11 also serves to hold or secure microscope 7. It is self-evident to anyone skilled in the art, however, that separate holding elements can also be present for microscope 7 and for knife holder 5. For example, only knife holder 5 is mounted on knife holder support 11, and an individual microscope adapter 20, with which microscope 7 is secured on sliding microtome 2, is then present for microscope 7. Depending on the embodiment of the invention, microscope adapter 20 or knife holder 11, in its particular one-piece embodiment, serves as a stable retainer for microscope 7. Microscope 7 is furthermore equipped with a camera 34. Microscope 7 defines an optical axis 31 that is perpendicular to motion plane 4 of the sliding microtome, and to cut surface 3a of the specimen.

Microscope 7 can be fine-positioned perpendicularly to the motion direction of specimen holder 3. Motion direction A-A for fine positioning of microscope 7 is indicated by double arrow B-B. The positioning of microscope 7 along double arrow B-B can be effected by rotation of knobs 21, 23. The rotation of knobs 21 and/or 23 actuates a fine drive 22 that is operatively connected to a carriage 26. Microscope 7 is mounted on carriage 26. The motion of carriage 26 along double arrow B-B is ensured by two guide rods 27, 28. Motion direction B-B of microscope 7 is parallel to cutting edge 6a of knife 6. Using fine drive 22, an object field 33 of specimen 3a can be adjusted in photo position 14. This can be effected with high resolution by the operator. Once fine positioning of the microscope 7 along guide rods 27, 28 has been achieved, this position of the microscope is fixed by means of at least one clamping apparatus 24, 25. This ensures that the lateral positioning of optical axis 31 is not inadvertently shifted by vibration during the cutting procedure. The clamping thus reliably prevents any lateral motion of microscope 7.

Figure 4:
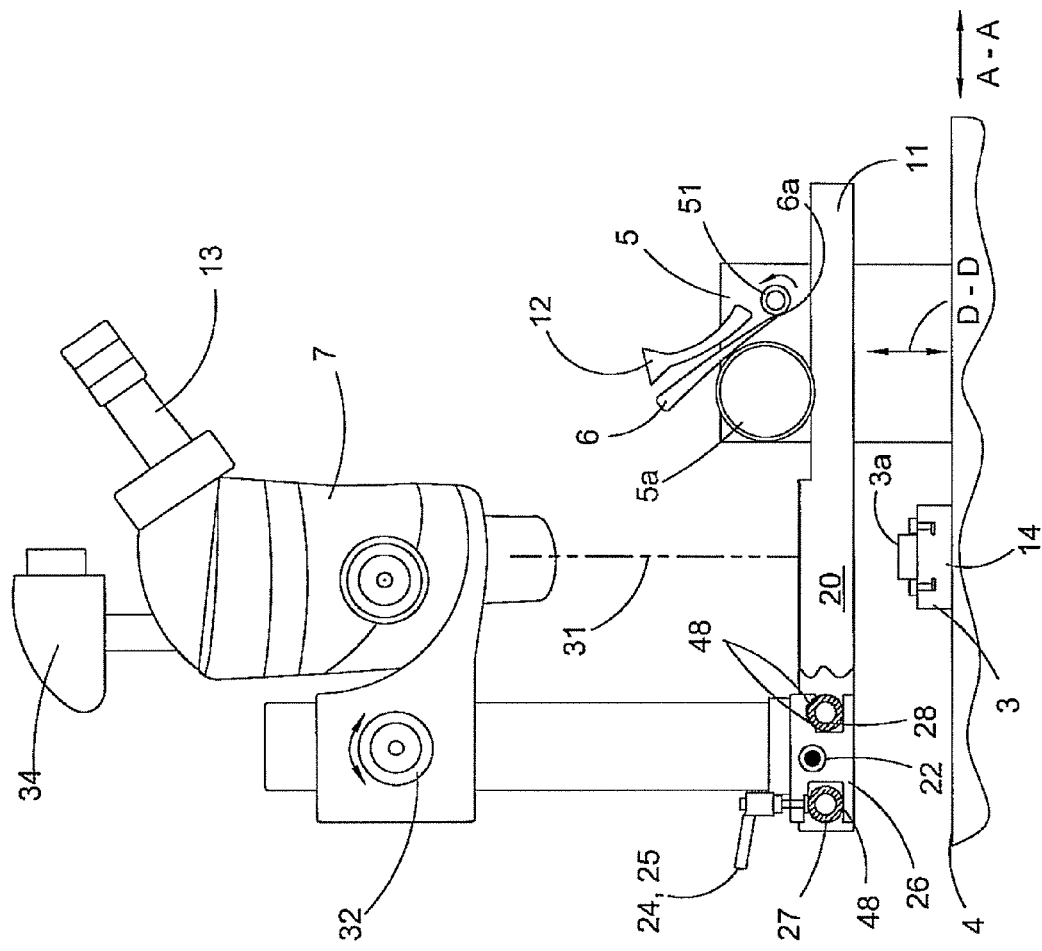
FIG. 4 is a side view of the apparatus illustrating the arrangement of the microscope in terms of the specimen holder and the knife holder.

FIG. 4 is a side view of the arrangement of microscope 7 in terms of knife holder 5 of sliding microtome 2. Knife holder 5 is mounted on knife holder support 11. As a result, knife 6 and/or knife holder 5 can easily be replaced without disassembling microscope 7 or microscope holder 20. Easy replacement of knife 6 is particularly important, since a plurality of cutting procedures cause cutting edge 6a of knife 6 to become worn and therefore blunt. A good cutting edge 6a having sufficiently good cutting properties is necessary for the production of perfect cut surfaces that are suitable for the acquisition of images. Sufficiently good cutting properties are defined by the sharpness of cutting edge 6a of knife 6.

The inclination of knife 6 can be adjusted via a displacement element 5a. It is of course self-evident that knife holder support 11 and microscope adapter 20 are embodied integrally. It is also conceivable for microscope adapter 20 to be mounted as a separate component on knife holder support 11. Knife holder support 11, and thus consequently also microscope adapter 20, are movable along double arrow D-D. FIG. 4 shows clearly that microscope 7 is arranged behind knife holder 5, on the side of sliding microtome 2 facing away from cutting edge 6a of knife 6. The arrangement of the microscope behind cutting edge 6a of knife 6 makes it possible also to remove individual histological sections when acquiring multiple images. The positioning of the microscope on the side of knife 6 facing away from cutting edge 6a moreover eliminates the possibility of the operator injuring him- or herself on cutting edge 6a during the manipulation of microscope 7.

For the cutting procedure, specimen 3a is moved onto cutting edge 6a of the knife along cutting direction A-A. Knife holder support 11 is embodied movably along double arrow D-D. Cutting edge 6a of knife 6 can thus be lowered by means of knife holder support 11 in order to adjust the section thickness. The lowering of knife holder support 11 is controlled by microtome 2 and by control unit 8 connected to the microtome. When specimen 3a, together with specimen holder 3, is moved into the starting position that is located at front end 4a (see FIG. 1) of sliding microtome 2, knife holder support 11 is correspondingly raised. Specimen 3a can thus be moved into the starting position without potential damage to the surface by knife 6. When specimen 3a is moved along from the starting position, beneath knife 6, into photo position 14, the topmost layer of specimen 3a is removed by cutting edge 6a of the knife. Because microscope 7 is fixedly joined to knife holder support 11 by microscope adapter 20, the focal plane of microscope 7 for viewing the new surface of specimen 3a is maintained. It is thus not necessary for the user to refocus microscope 7 onto the surfaces of specimen 3a during imaging of the many just-created cut surfaces of specimen 3a.

As already mentioned, carriage 26 with which microscope 7 is secured to microscope 20 is embodied movably. Carriage 26 is embodied with multiple guide surfaces 48 around guide rods 27 and 28. The effect of gravity on microscope 7, which is mounted on carriage 26, causes a tilting of carriage 26 about the rotation axis constituted by fine drive 22. This ensures, even before clamping by way of clamping apparatus 24, 25, that guide surfaces 48 on carriage 26 are resting on guide rods 27, 28. No axial or lateral movement therefore occurs as a result of clamping, so that repositioning with fine drive 22, and refocusing by means of focus drive 32 of the microscope, are not necessary.

It is apparent from FIG. 4 that an aspiration apparatus 12 can be provided in the region of cutting edge 6a of knife 6. An aspiration apparatus (not depicted) can similarly be mounted in the region of photo position 14. Width 52 of aspiration device 12 is ideally greater than the width of specimen 3a. Aspiration of the cut-off pieces (individual histological sections) prevents them from adhering either to knife 6 or to specimen 3a, and impairing the quality of subsequent sections or interfering with imaging in photo position 14. Alternatively, as depicted in FIG. 4, a rotating brush 51 can be attached to knife 6 and can wipe the cut-off piece away from knife 6 opposite to cutting direction A-A. The cut-off piece is thereby loosened, and can be aspirated with aspiration apparatus 12. The effect of aspiration apparatus 12 can be optimized by regulating the aspiration apparatus (intensity and duration).

Aspiration apparatus 12 can also be embodied as a cooling device for the specimen embedded in paraffin. The paraffin heats up during the cutting procedure as a result of the friction that occurs. This soft paraffin interferes with proper cutting. By switching over the aspiration apparatus, filtered and/or cooled air can be directed onto the paraffin block having the specimen. The possibility also exists, of course, of providing a separate cooling apparatus, preferably at front end 4a of the sliding microtome.

What is claimed is:

1. An apparatus for producing multiple images of a specimen, the apparatus comprising:

a sliding microtome including a specimen holder movable in a plane for carrying a specimen, a knife holder arranged above the plane, and a knife held by the knife holder, the knife having a cutting edge for removing layers of the specimen and for producing a respective new cut surface on the specimen, the cutting edge facing a front end of the sliding microtome corresponding to a starting position of the specimen holder;

a knife holder support for mounting the knife holder on the apparatus, wherein the knife holder support for the knife holder is displaceable along a direction perpendicular to the plane in which the specimen holder is movable;

a microscope mounted on the sliding microtome, the microscope defining an object field and a focal plane, wherein the focal plane of the microscope is coplanar with each new cut surface on the specimen;

a microscope holder for mounting the microscope on the apparatus above the plane in which the specimen holder is movable; and a camera attached to the microscope for respectively acquiring an image of each new cut surface of the specimen when the specimen is moved by the specimen holder into the object field of the microscope to a photo position located at a rear end of the sliding microtome opposite from the front end of the sliding microtome.

2. The apparatus according to claim 1, wherein the microscope holder for the microscope is displaceable, separately from the knife holder support, along a direction perpendicular to the plane in which the specimen holder is movable.

3. The apparatus according to claim 1, wherein the knife holder support carries the microscope in addition to the knife holder.

4. The apparatus according to claim 3, wherein the knife holder support that carries the knife holder and the microscope is displaceable along a direction perpendicular to the plane in which the specimen holder is movable.

5. The apparatus according to claim 1, wherein the knife is arranged in the knife older such that the cutting edge of the knife extends perpendicular to the motion direction and parallel to the plane in which the specimen holder is movable.

6. The apparatus according to claim 1, wherein the specimen holder is movable in a cutting direction such that a specimen carried by the specimen holder passes the cutting edge to remove a layer of the specimen and travels into the object field of the microscope for observation of a new cut surface of the specimen.

7. The apparatus according to claim 6, further comprising a fine displacement system for displacing the microscope along a direction perpendicular to the cutting direction of the specimen holder.

8. The apparatus according to claim 7, wherein the fine displacement system includes a guide along which the microscope is displaceable and at least one clamping elements for locking the microscope in a selected position along the guide.

9. The apparatus according to claim 1, further comprising:
a control unit connected to the knife holder support and the microscope for controlling displacement of the knife holder support to set a thickness of a layer to be removed from the specimen and for controlling imaging of each new cut surface of the specimen by the microscope; and
a computer connected to control unit for synchronizing imaging with operation of the microtome and for processing a plurality of images of corresponding to new cut surfaces of the specimen.

10. The apparatus according to claim 9, wherein the computer and the control unit are combined together into one unit.

11. The apparatus according to claim 9, wherein the computer includes a memory unit in which successive images of new cut surfaces of the specimen are stored for image processing.

12. The apparatus according to claim 11, wherein the computer generates a three-dimensional image of the specimen from the successive images of new cut surfaces.

13. The apparatus according to claim 1, wherein the microtome further includes an aspiration device arranged near the cutting edge of the knife, wherein the aspiration device aspirates layers of the specimen that have been removed.

14. The apparatus according to one of claims 13, wherein the microtome further includes a rotating brush arranged near the cutting edge of the knife for loosening cut layers from the specimen and from the knife.

15. The apparatus according to one of claim 13, wherein the microtome includes a cooling device for directing air flow at the specimen to cool the specimen.

16. The apparatus according to claim 15, wherein the aspiration device is also operable as the cooling device.

17. The apparatus according to claim 1, wherein the microscope is a stereomicroscope including a first observation beam path and a second observation beam path, and the apparatus comprises a pair of cameras associated one with each of the first and second observation beam paths for acquiring a pair of images of each new cut surface of the specimen from slightly different perspectives, and the apparatus further comprises a computer for storing and processing the acquired images.

18. The apparatus according to claim 1, wherein the cutting edge of the knife is a stationary cutting edge.

19. The apparatus according to claim 1, wherein the cutting edge of the knife is a rotating cutting edge.

20. A method for producing multiple images of a specimen comprising the steps of:
clamping the specimen in a specimen holder of a microtome, the specimen holder being movable in a plane;
positioning the specimen holder at a starting position;
moving the specimen holder in the plane, thereby passing the specimen beneath a cutting edge of a microtome knife to remove a layer from the specimen and expose a new cut surface of the specimen;
continuing to move the specimen holder in the plane to position the specimen holder at an imaging position wherein the new cut surface of the specimen is located in an object filed of a microscope;
acquiring an image of the new cut surface by operating a camera associated with the microscope;
raising a knife holder in which the microtome knife is held; and
moving the specimen holder in the plane to return the specimen holder to the starting position so that a further cut surface can be produced.

21. The method according to claim 20, further comprising the step of lowering the knife holder while the specimen holder is at the starting position, thereby bringing the microtome knife into a position such that a further layer can be removed from the specimen.

22. The method according to claim 21, wherein the steps are successively repeated to acquire a plurality of images corresponding to different cut surfaces of the specimen.

23. The method according to claim 22, wherein the steps are performed automatically in response to signals from a control unit.

24. The method according to claim 23, wherein the steps are synchronized by a computer in communication with the control unit.

25. The method according to claim 22, further comprising the steps of:
storing the plurality of acquired images in a memory; and
processing the plurality of acquired images to generate a three-dimensional image of the specimen.

26. The method according to claim 22, further comprising the step of aspirating each cut layer of the specimen to assist removal of the cut layer from the specimen and the knife.

27. The method according to claim 26, further comprising the step of engaging each cut layer with a brush to assist removal of the cut layer from the specimen and the knife.

28. The method according to claim 25, wherein the microscope is a stereomicroscope having first and second observation beam paths, and a pair of images of each new cut surface are acquired from slightly different perspectives corresponding to the first and second observation beam paths.

* * * * *